Aug. 21, 1934. R. R. SMITH Re. 19,283

DRY CELL

Original Filed June 4, 1930

INVENTOR:
Ralph R. Smith,
BY
Byrnes, Townsend + Potter,
ATTORNEYS.

Reissued Aug. 21, 1934 Re. 19,283

UNITED STATES PATENT OFFICE 19,283

DRY CELL

Ralph R. Smith, Cleveland, Ohio, assignor to National Carbon Company, Inc., a corporation of New York Original No. 1,949,586, dated March 6, 1934, Serial No. 459,161, June 4, 1930. Application for reissue May 22, 1934, Serial No. 726,999

8 Claims. (Cl. 136—135)

This invention pertains to dry cells in general and in particular to a dry cell having a wire terminal or clip of sheet metal secured to the carbon electrode thereof.

The most common practice of attaching clips to such electrodes is to solder the clip to a metal dowel secured to the electrode. In order that the clip be securely soldered and held square with the cell it is a frequent practice to have a brass cap with a diameter slightly larger than the width of the clip, placed over the shoulder of the dowel and held in place by the sealing compound. The clip is then placed over the top of the dowel and on top of the brass cap and held in position while the clip is soldered in place. It is obvious that the brass cap and solder are expensive and that the operation of placing the clip, soldering and holding until solder has set is very slow and costly.

Elimination of the soldering, therefore, by the substitution of some type of riveting operation for completing the attachment between the clip and the electrode has long been attractive. Such step, however, on the basis of repeated trials of various sorts, has proven difficult of accomplishment without the introduction of costs sufficient to eliminate the economies sought, or of factors inimical to the quality or appearance of the cell. A few of these trials will be mentioned here briefly to illustrate the problems encountered and overcome by my improved cell.

One method was to attach the clip subsequent to pouring the final seal. In this method a clip attached to a dowel, and a complete cell including the seal were brought together, and then a hole was drilled down through the sealing material into the central carbon electrode, and the dowel was inserted therein. This method was objectionable because in drilling through the sealing material it adhered to the drill and then split or broke the electrode. Other objections were high cost, high drill consumption, and leaky cells due to seals injured during the operations of drilling the electrode and inserting the dowel.

Another method was to attach the assembled clip and dowel to the central electrode before pouring the final seal, but this method was unsatisfactory on account of high cost of handling and assembling, and the added difficulties encountered in pouring the sealing compound around two clips instead of one. While this method of assembly produces a cell of satisfactory quality, the high manufacturing cost is objectionable and in these days of keen competition high cost is even more objectionable than impaired quality.

Another method comprises attaching the dowel to the central electrode prior to the assembly of the cell using a heavy brass cap of smaller diameter than the electrode to support the shoulder of the dowel. This method was unsatisfactory on account of the added cost of the cap and the high cost of the spinning operation necessary to avoid injuring a prohibitive number of cells by loosening the electrode from the mix and forcing it through the bottom liner.

A variation of the last described method comprises the use of a high speed hammer instead of a spinning tool to attach the clip to the dowel, but this method was unsatisfactory on account of the large number of electrodes loosened from the mix body. Furthermore, the hammer operation leaves a rough serrated top on the dowel that is undesirable from the standpoint of appearance, and both the spinning tool and the hammer tend to loosen the dowels in the electrodes. A still further objection to these methods is the difficulty encountered in centering the dowels in the cells so that the dowels are properly positioned in either the spinning or riveting machine when the cells are located by their outer surfaces.

Therefore, one of the objects of this invention is to provide a cell of the type described that is easier to assemble, neater in appearance, lower in cost, and higher in quality.

Other objects are to provide such a cell in which ordinary use will not cause relative movement between the component parts, and in which the assembly of the wire terminal to the carbon electrode is not liable to cause obscure injury to the cell.

Other aims, objects, and novel features, will be apparent from the following description and the accompanying illustration, in which.

Figure 1:
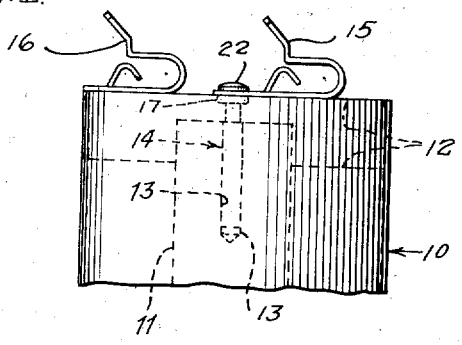
Fig. 1 is a side view of the upper end of a complete dry cell showing both the positive and negative spring clips in place, and the position of the carbon electrode and the dowel in broken lines.
Figure 2:
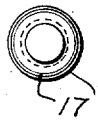
Fig. 2 is a top view of the upper end of the dowel.
Figure 3:
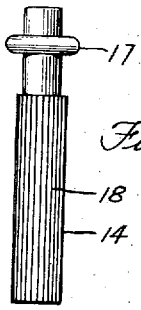
Fig. 3 is a side view of the dowel.
Figure 4:
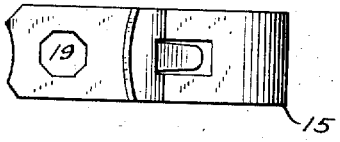
Fig. 4 is a top view of the positive spring clip showing the non-circular opening by means of which it is attached to the dowel.
Figure 5:
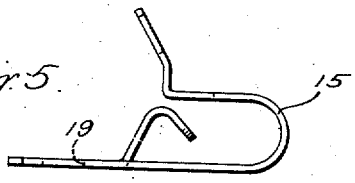
Fig. 5 is a side view of the clip shown in Fig. 4.
Figure 6:
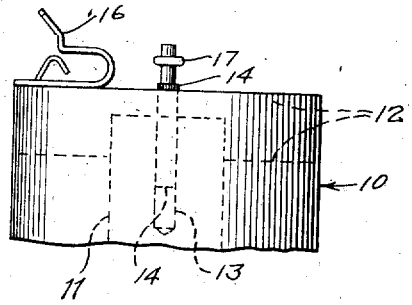
Fig. 6 is a side view of the upper end of a dry cell showing the dowel in position for receiving the spring clip.
Figure 7:
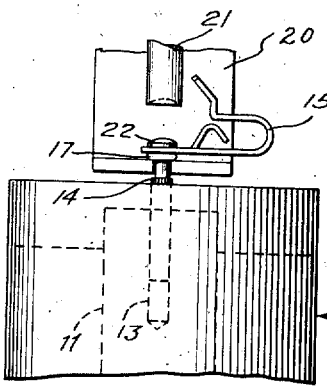
Fig. 7 shows the position of the cell and the tools during the operation of spinning the clip on to the exposed end of the dowel.
Figure 8:
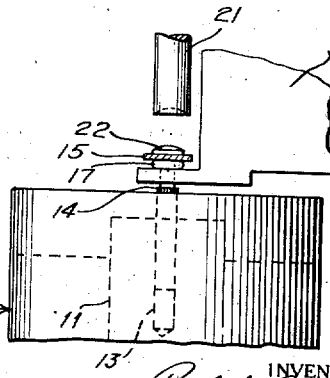
Fig. 8 is a side view of the cell and tools shown in Fig. 7.

Dry cells having my improved wire terminal may embrace a large variety of forms according to the particular use for which they are intended, but the preferred form shown in the accompanying drawing comprises a cell 10 having a central positive electrode 11 of carbon with the upper end thereof terminating below the top of the cell and covered by the sealing compound 12 by which the top of the cell is closed. The electrode 11 has a central or axial opening 13 extending from the upper end thereof downward and in which a metal dowel 14 is rigidly secured so that it extends upward through the sealing compound 12 where a sheet metal wire terminal 15, such as a Fahnestock clip, is attached thereto. Another wire terminal or Fahnestock clip 16 is attached to the outer or negative cell electrode in the usual manner.

The dowel 14 is cylindrical in form having an enlarged portion or collar 17 near the upper end and a roughened or knurled portion 18 extending some distance upward from the lower end.

The general form and outline of the clip 15 is already well known, but the best method of riveting it to a dowel member presents some problems. A circular opening may be provided in the clip to slip over a cylindrical portion of the dowel. It is then possible by an adequate riveting operation to make an attachment between the two of a satisfactory nature. But if the opening in the clip and the upper end of the dowel be made non-circular, it is much easier to rivet the two together in a manner to impart permanent rigidity against the strains of subsequent use. Unfortunately this procedure increases cost, and frequently introduces an inconvenient necessity of orienting the dowel so that the attached terminal will eventually lie in the desired direction with relation to other cell parts. The assembly time is also longer when both the parts fit through non-circular components.

I have found that all the desired ease of riveting to a permanently tight condition, and avoidance of the various objections just cited, can be obtained by using a non-circular opening 19 in the clip 15, with a dowel stem of any shape but sufficiently small to allow the clip to rotate easily on the dowel. The dowel stem can then be made of the cheapest manufacturing shape, the time of assembling the parts is minimized, the clip can be lined in any desired direction, and in the riveting or spinning operation the dowel is upset and expanded so that it substantially fills the non-circular opening 19, thereby forming an interlocking pressure joint of non-circular outline that prevents the clip from turning on the dowel. Such opening 19 may be any shape other than round, so long as its periphery is a varying distance from the center. For convenience in manufacture and assembly I prefer an opening of octagonal form and a dowel stem of cylindrical form.

In assembling the wire terminal and the cell, I take a carbon electrode 11 with an axial opening 13 therein, and press the dowel 14 part way into the opening 13 so that when the electrode 11 is assembled with the remaining portions of the cell the flange 17 is above the eventual top level of the sealing compound 12. After having assembled the dowel and electrode as described I proceed to assemble the cell complete with the exception of the clip 15.

After the sealing compound 12 has cooled and hardened the clip 15 is attached to the top of the dowel 14 by resting the collar 17 on an anvil 20 of a spinning or riveting machine, placing the clip 15 on the dowel 14 so that the top of the dowel extends upward through the opening 19 and the clip rests on the shoulder 17, and then manipulating the machine to bring the spinning or riveting tool 21 down on the top of the dowel 14 thereby expanding it into the opening 19 and, at the same time, forming a head 22 thereon so that the clip is held securely between this head 22 and the collar 17. The assembly is then completed by pressing the dowel the rest of the way into the electrode so that the bottom of the clip 15 is either close to or in contact with the top of the sealing compound 12.

By drilling the opening 13 and inserting the dowel 14 therein before assembling the electrode in the cell, the troubles encountered in drilling through the sealing compound into the electrode are avoided. This reduces the cost of the cell.

By attaching the clip 15 to the dowel 14 after the sealing compound is in place obviates the trouble and consequent expense of pouring the sealing material around two clips instead of one. This feature still further reduces the cell cost.

While a percussive riveting operation may be employed to attach the clip 15 to the dowel 14, I prefer a riveting operation performed by cold rolling and commonly called spinning because it produces a smooth surface on the top of the dowel that has a better appearance than the rough surface left by a riveting operation. There is also less vibration transmitted to the cell, and consequently, less liability of loosening the mix from the central electrode.

Modern dry cells, instead of having a seal 12 of only one compound, frequently have a seal of two compounds having different characteristics. A modified form of my improved method of assembly when applied to such cells comprises taking a partially assembled cell, having the center electrode and dowel assembled to its finished or ultimate height; pouring the first sealing compound in the top of the cell; attaching the clip 15 to the top of the dowel 14 by means of a spinning or riveting operation; and then pouring the second sealing compound in the top of the cell. It is evident that when two sealing compounds are used that both may be poured in place before the clip is attached to the dowel in the same manner as that employed when only one is used.

Various changes may be made in the structure and arrangement of the component parts of this invention, and equivalent materials and processes may be substituted for those specified, without departing from the invention or sacrificing any of the rights thereunder.

I claim:

1. A dry cell having a central electrode terminating below the top of the cell, a sealing compound closing the cell, a dowel carried by said electrode and provided with a collar above said sealing compound and a head above said collar, and a spring clip terminal rigidly secured to said dowel between said collar and said head.

2. A dry cell having a central electrode terminating below the top of the cell, a sealing compound closing the cell, a dowel carried by said electrode and provided with a collar above said sealing compound, a head spaced above said collar and a non-circular portion between said collar and said head, and a wire terminal having a non-circular opening closely fitting said portion rigidly secured to said dowel between said head and said collar.

3. A dry cell having a central electrode, a sealing compound covering the upper end of said electrode and closing the top of the cell, a dowel carried by said electrode and provided with an integral collar above said sealing compound and an integral head spaced above said collar, and a wire terminal rigidly secured to said dowel between said collar and said head by an interlocking pressure joint of non-circular outline.

4. A dry cell having a central electrode, a sealing compound covering the upper end of said electrode and closing the top of the cell, a dowel carried by said electrode and extending upward through said sealing compound, an integral head on the upper end of said dowel, and an integral non-circular portion smaller than said head on said dowel below said head, an integral collar larger than said non-circular portion on said dowel below said portion, and a spring clip terminal having a non-circular opening closely fitting said portion and rigidly secured under pressure between said head and said collar by a pressure joint of non-circular outline.

5. A dry cell having a central electrode terminating below the top of the cell, sealing means closing said cell, a dowel carried by said electrode and provided with a collar above said sealing means and a head above said collar, and a terminal member rigidly secured to said dowel between said collar and said head.

6. A dry cell having a central electrode, sealing means closing said cell, a dowel carried by said electrode and provided with a collar above said sealing means and a head above said collar, and a terminal member rigidly secured to said dowel between said collar and said head.

7. A dry cell having a central electrode, sealing means closing said cell, a dowel extending through the said sealing means and carried by said electrode, the said dowel having a collar disposed above the said sealing means and having an enlarged head above said collar, and a terminal member connected with the said dowel between said collar and said head and secured against turning movement with respect to the dowel.

8. A dry cell having a central electrode terminating below the top of the cell, sealing means closing the said cell, a dowel carried by the said electrode and extending through the said sealing means, the dowel having a collar disposed above the upper surface of the said sealing means, a head disposed above the said collar and a mid-portion of smaller non-circular cross-section disposed between said collar and head, and a terminal member rigidly secured to said dowel mid-portion against turning movement with respect to the dowel.

RALPH R. SMITH.